(12) United States Patent
Khatri

(10) Patent No.: US 7,573,388 B2
(45) Date of Patent: Aug. 11, 2009

(54) RFID DEVICE WITH AUGMENTED GRAIN

(75) Inventor: Mohamed Fayaz S. Khatri, Kettering, OH (US)

(73) Assignee: The Kennedy Group, Inc., Willoughby, OH (US)

( * ) Notice: Subject to any disclaimer, the term of this patent is extended or adjusted under 35 U.S.C. 154(b) by 112 days.

(21) Appl. No.: 11/297,704

(22) Filed: Dec. 8, 2005

(65) Prior Publication Data

US 2007/0132591 A1 Jun. 14, 2007

(51) Int. Cl.
*G08B 13/14* (2006.01)

(52) U.S. Cl. .................... 340/572.7; 343/815; 343/818; 343/749

(58) Field of Classification Search ... 340/572.1–572.9, 340/568.1, 567, 686.1
See application file for complete search history.

(56) References Cited

U.S. PATENT DOCUMENTS

| | | | | |
|---|---|---|---|---|
| 5,686,928 A | * | 11/1997 | Pritchett et al. | 343/711 |
| 6,222,452 B1 | * | 4/2001 | Ahlstrom et al. | 340/572.1 |
| 6,275,157 B1 | * | 8/2001 | Mays et al. | 340/572.5 |
| 6,278,413 B1 | | 8/2001 | Hugh | |
| 6,642,897 B2 | * | 11/2003 | Forster et al. | 343/767 |
| 7,063,265 B2 | * | 6/2006 | Fujiki et al. | 235/488 |
| 7,124,943 B2 | * | 10/2006 | Quan et al. | 235/451 |
| 7,180,423 B2 | * | 2/2007 | Forster et al. | 340/572.7 |
| 7,323,977 B2 | * | 1/2008 | Kodukula et al. | 340/505 |
| 2004/0201479 A1 | | 10/2004 | Garber | |
| 2006/0244662 A1 | * | 11/2006 | Bauer et al. | 343/700 MS |

FOREIGN PATENT DOCUMENTS

GB 2393076 3/2004

OTHER PUBLICATIONS

Extended European Search Report dated Apr. 2, 2007 for Application No. 06253046.4.

* cited by examiner

*Primary Examiner*—Benjamin C Lee
*Assistant Examiner*—Daniel Previl

(57) ABSTRACT

A radio frequency identification device including a substantially planar surface. Surface has a longitudinal axis and lateral axis. A plurality of discrete longitudinally spaced laterally elongate conductive dipole elements is mounted to surface. In the present embodiment these elements include a director element, a reflector element, and a driven element that is positioned intermediate of the director element and the reflector element. A radio frequency identification chip is conductively attached to driven element.

1 Claim, 9 Drawing Sheets

RFID DEVICE WITH AUGMENTED GRAIN

BACKGROUND

Radio frequency identification ("RFID") devices, such as RFID tags, are commonly used for wireless identification. An RFID tag typically includes an RFID chip attached to an antenna, packaged in such a way that it can be applied to an object. For example, a tag may be packaged as a RFID label that can be peeled from a release liner and affixed to a product or the tag may simply be mounted inside a carton or packaging of a retail product. Generally, the RFID chip contains information about or associated with the object to which the tag has been applied. A remote interrogator (also called a reader) reads the information from the RFID chip by communicating with the RFID tag via wireless radio signals. The maximum range at which a tag is readable by the interrogator is quantifiable by measuring in decibels the gain of that particular tag.

Known RFID tags have relatively low gains. For example, a standard 4-inch by 6-inch label will commonly have a gain of around 1.8 decibels. It will be appreciated that this limits the usage of such tags.

SUMMARY

In general, the present invention relates to a method and apparatus for increasing the gain of an RFID tag, without increasing the size of the RFID tag.

In accordance with a first aspect of the invention, there is provided an RFID tag including: a surface having a longitudinal axis and lateral axis; a plurality of discrete longitudinally spaced laterally elongate conductive elements mounted to the surface; and an RFID chip conductively connected to one of the elements. Typically, the surface is planar or substantially planar.

In some embodiments the elements include: a director element; a reflector element; and a driven element positioned between the director element and the reflector element.

In some embodiments the RFID chip is mounted to one of the elements, such as the driven element.

Normally, the director element, driven element and reflector element collectively define an antenna. In most cases, at least one of the elements is configured to provide capacitive loading to the defined antenna. In some cases, each element is configured to provide capacitive loading to the antenna. In some embodiment each element is substantially bowtie shaped.

In some embodiments, the RFID chip is responsive to a signal having a predefined wavelength, and the antenna has a maximum lateral dimension of less than half the predetermined wavelength.

In some embodiments, each element is defined by a center portion having a pair of oppositely directed laterally extending arms. The RFID chip may be mounted to the center portion of the driven element.

In some embodiments, the arms of each element are substantially symmetrical about their center portion, and in some cases, the elements are centrally aligned about a longitudinal axis.

In some embodiments, the arms of at least one element include respective regions of increased longitudinal dimension in relation to the center portion. In some cases, the regions may progressively diverge from the center portion. Still, in other embodiments, the regions include lateral extremities extending from the arms.

The elements may be evenly spaced, centrally aligned, and relatively increase in maximum lateral dimensions along a longitudinal progression. In some cases, each element is symmetrical about a respective longitudinal axis, the longitudinal axes being parallel with each other.

According to a second aspect of the invention, there is provided a substrate for carrying a RFID tag, the substrate including: a substantially planar surface having a longitudinal axis and lateral axis; a plurality of discrete longitudinally spaced laterally elongate conductive elements mounted to the surface; and an RFID chip conductively mounted to one of the elements.

According to a third aspect of the invention, there is provided a method for manufacturing a substrate for carrying a RFID tag including the steps of: providing a substantially planar surface having a longitudinal axis and lateral axis; imprinting on the surface a plurality of discrete longitudinally spaced laterally elongate conductive elements, wherein at least one of the elements is configured for conductively carrying an RFID chip.

According to a further aspect of the invention, there is provided an antenna for an RFID chip, the antenna including: a director element; a reflector element longitudinally spaced from the director element; and a driven element for carrying the RFID chip, the driven element being longitudinally spaced from and positioned intermediate of the director element and the reflector element.

DETAILED DESCRIPTION

Figure 1:
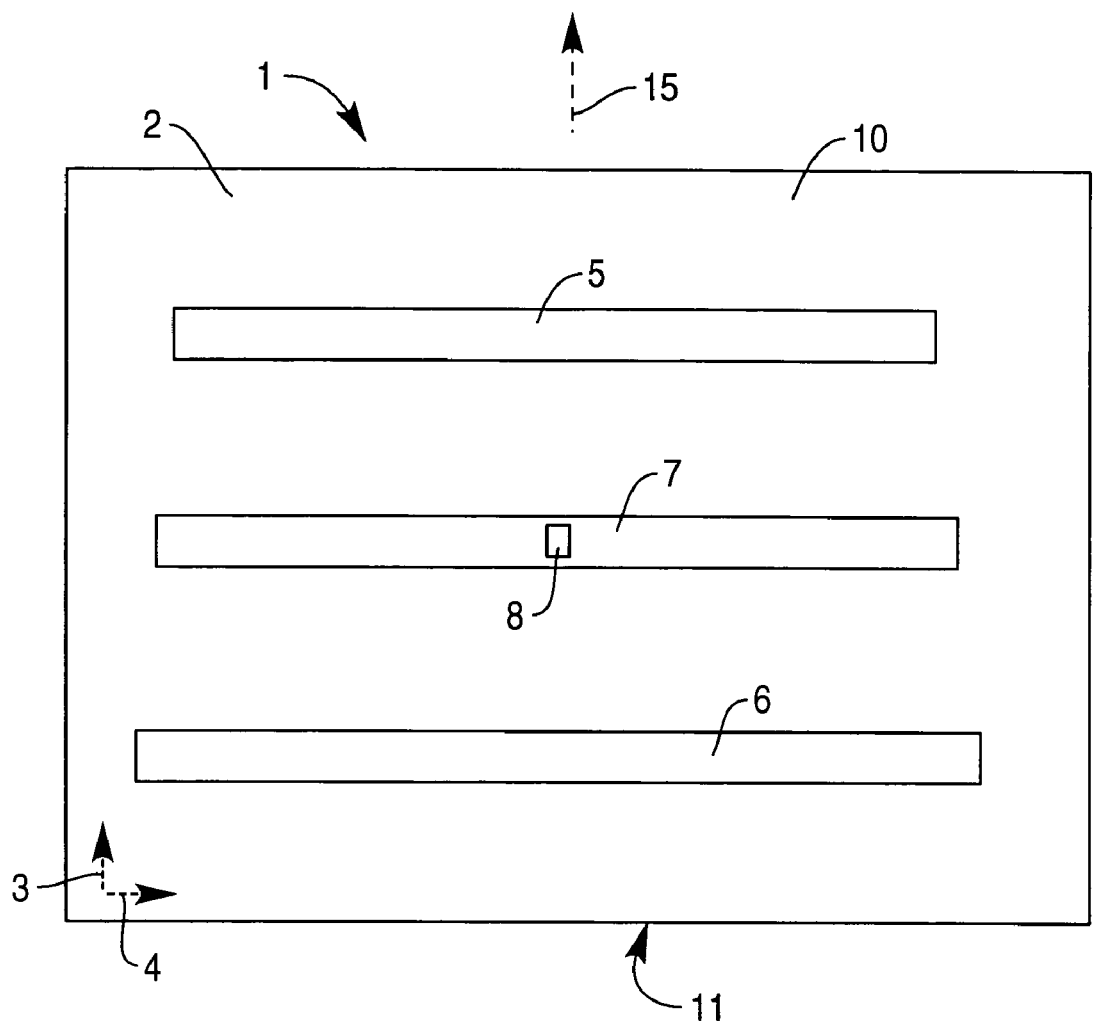
FIG. 1 is a top view of an RFID tag according to a first embodiment of the present invention.

FIG. 1 illustrates an RFID tag 1 including a surface 2, which is substantially planar. The surface 2 has a longitudinal axis 3 and lateral axis 4. Three discrete longitudinally spaced laterally elongate conductive dipole elements are mounted to the surface 2. In the present embodiment these elements area director element 5, a reflector element 6, and a driven element 7. Typically the driven element 7 is positioned between director element 5 and reflector element 6. A RFID chip 8 is conductively attached to driven element 7, and may be mounted thereon. In the present embodiment the RFID chip 8 is a passive RFID chip, though in other embodiments an active RFID chip may be used.

It will be appreciated that axes 3 and 4 need not be axes of symmetry, and are provided for the sake of directional reference only.

By the term "discrete", a substantive electrical separation is inferred. That is, elements 5 to 7 are not electrically or conductively connected, disregarding any slight conductive properties of surface 2. Typically, surface 2 is an insulator.

In the example shown in FIG. 1, elements 5 to 7 are evenly spaced, centrally aligned rectangles having comparatively increasing lateral dimensions from element 5 to element 6. Alternate shapes, dimensions, alignments and spacings are used in other embodiments. Some specific alternate shapes and configurations are described below The surface 2 is defined on a substrate, in the form of an RFID label 10. The RFID labels are known to those skilled in the art and are not described. Typically these labels are formed from either paper or plastics such as PET. The label 10 includes an opposite surface 11, as shown in FIG. 1 for mounting the tag 1 to an object. The surface 11 typically includes a coating of pressure sensitive adhesive, however, in other embodiments, alternate mounting techniques are implemented. In some embodiments, the surface 2 is defined on an object, such as a packaging container. As such, the elements 5 to 7 are mounted directly on the object.

The elements 5 to 7 are typically formed from any one of a variety of conductive materials. The material selected generally depends on the construction technique used to mount the elements 5 to 7 to the surface 2. For example, in some embodiments conductive inks—such as inks containing copper or silver—are printed onto the surface 2. Various other construction techniques and materials will be known to those skilled in the art and may be used to construct the RFID tag 1.

It will be appreciated that the director element 5, the driven element 6 and the reflector element 7 collectively define an antenna. In the configuration illustrated in FIG. 1, the antenna is a Yagi antenna. In some alternate embodiments the elements are positioned to define alternate classes of antenna, such as antennas only loosely falling within the common definitions of a Yagi antenna.

To maximize power transfer between this antenna and the RFID chip 8, and vice versa, the respective impedances should be a conjugate match. It will be appreciated that the chip 8 has a fixed impedance, and as such the dimensions of the elements 5 to 7 are selected to achieve this conjugate match. For example: by selection of the lateral and longitudinal dimensions of element 7. Those skilled in the art will understand techniques for measuring impedance and achieving a conjugate match.

Figure 3:
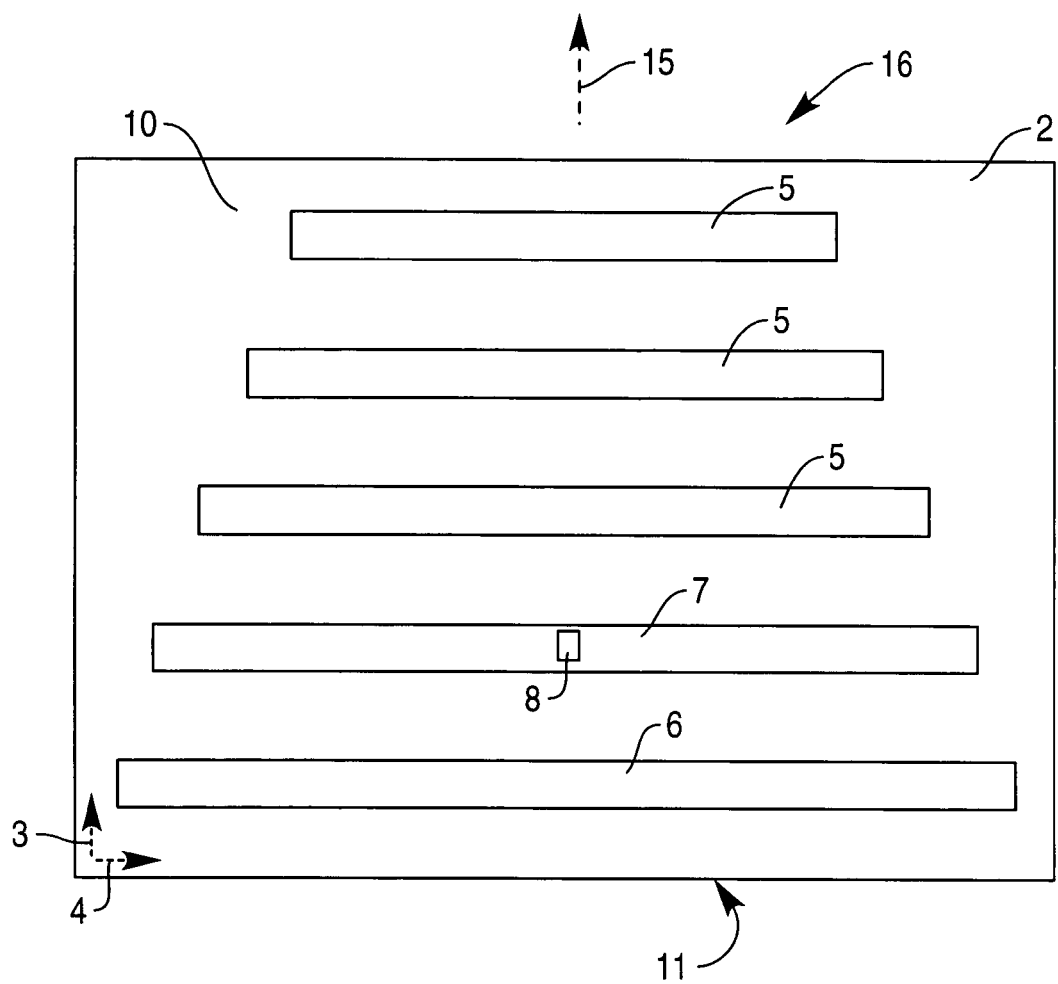
FIG. 3 is a top view of an RFID tag according to a third embodiment of the present invention.

Although embodiments described herein disclose only three discrete elements, this should not be taken as limiting. For example, in some embodiments a plurality of additional director elements 5 are longitudinally spaced from element 5 in a direction away from elements 6 and 7. An example of such an embodiment is tag 16 of FIG. 3.

In use, the RFID chip 8 is responsive to a radio interrogation signal having a predefined frequency and wavelength. In response, the chip 8 provides a tag signal indicative of identification information. For example, an RFID reader transmits an appropriate interrogation signal to define an interrogation zone. When the tag 1 enters or resides within the interrogation zone, the reader subsequently receives the tag signal. The reader processes this signal to derive identification information, which is typically further processed for practical purposes. For example, the tag 1 may be mounted to an object A for identification of object A. The identification information stored by the tag 1 is associated with object A in a database. As such, a reader is able to report whether the object A has entered into, remains in, or has left an interrogation zone monitored by that reader. A multitude of alternate applications are known and widely used.

A limiting factor for the size of an interrogation zone relates to the read range and or gain of an RFID tag. By providing an antenna in accordance with embodiments of the present disclosure, RFID tags having particular gain characteristics are possible. Typically, a Yagi antenna is directional and results in an RFID tag having a maximum gain in a direction 15, which is dependent on specific configuration characteristics. This maximum gain is of greater magnitude compared with the gain of known RFID tags having similar overall dimensions. This is dealt with in greater detail below, with reference to a gain diagram provided in FIG. 5.

In the embodiment of FIG. 1, the element 7 is sized to have a lateral dimension of approximately half of the wavelength of an interrogation signal to which the chip 8 is responsive to maximize gain characteristics. It is found that element 7 resonates at this size. For example, in an embodiment where the interrogation signal has a frequency of 915 Megahertz, the wavelength is approximately 33 centimeters. As such, the element 7 has a lateral dimension of approximately 16.5 centimeters.

It is typically advantageous from a commercial and aesthetic perspective to reduce the size of RFID tags. To this end, in some embodiments capacitive loading is used to reduce dimensions of elements 5 to 7, and hence the antenna defined by the elements. A specific example of this is provided in FIG. 2. In some alternate embodiments only a selection of the elements are configured to provide capacitive loading, which provides practical effects without necessarily resulting with a smaller antenna.

Figure 2:
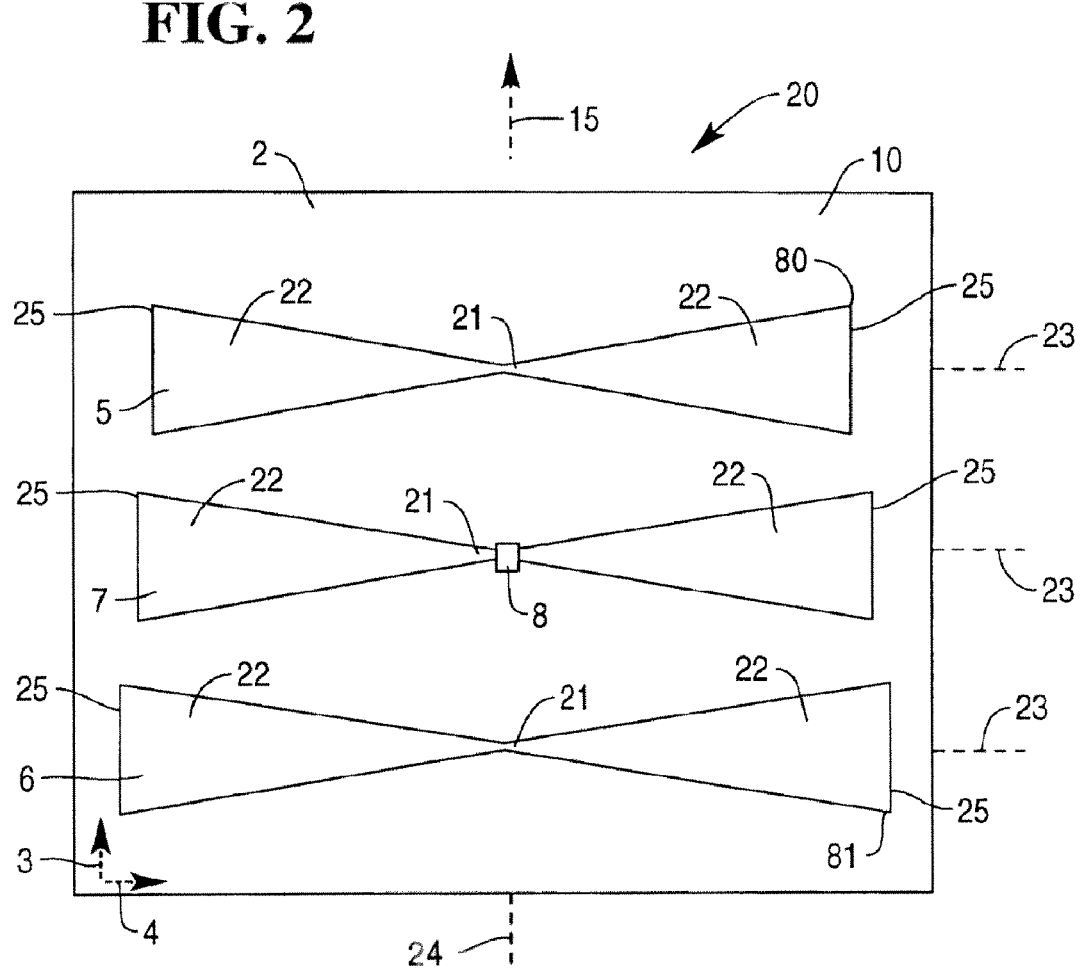
FIG. 2 is a top view of an RFID tag according to a second embodiment of the present invention.

FIG. 2 illustrates an RFID tag 20 wherein each element 5 to 7 is configured to provide capacitive loading to the antenna. Each element 5 to 7 is defined by a center portion 21 having a pair of oppositely directed laterally extending arms 22. The chip 8 is conductively connected to the center portion of element 7.

For each element 5 to 7, the arms 22 are substantially symmetrical about the center portion 21. Further, the arms are inherently symmetrical about their respective lateral axes 23. The elements are centrally aligned about a common longitudinal axis 24.

Each arm 22 progressively increases in width, i.e. longitudinal dimension, as its extends from its respective center portion 21 to its lateral extremity 25, thereby providing each element 5 to 7 with a bowtie shape.

Figure 4:
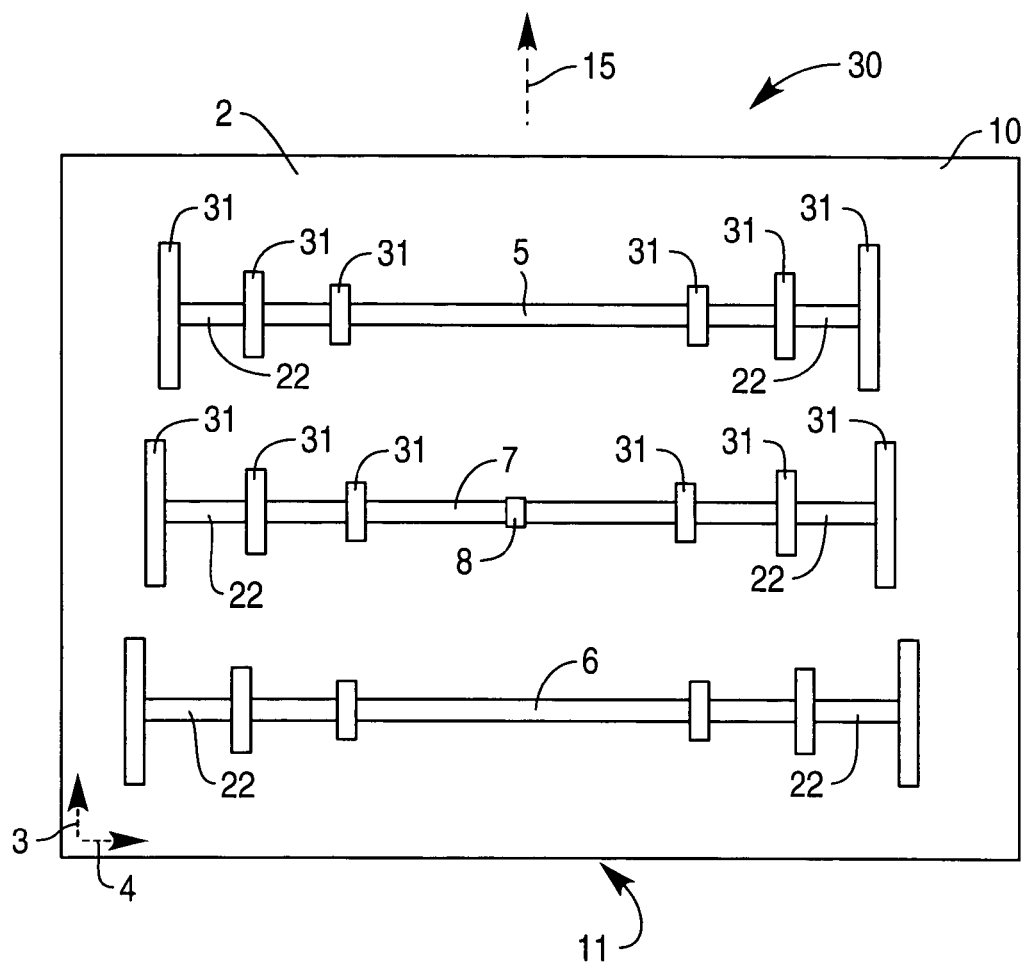
FIG. 4 is a top view of an RFID tag according to a further embodiment of the present invention.

In other embodiments, rather than a progressive widening, regions of increased longitudinal dimensions are localized at lateral locations on the arms 22, such as lateral extremities. Specific examples include:

Tag 30 of FIG. 4, which includes a plurality of laterally spaced regions 31 of outwardly progressively increasing longitudinal dimensions.

Figure 7:
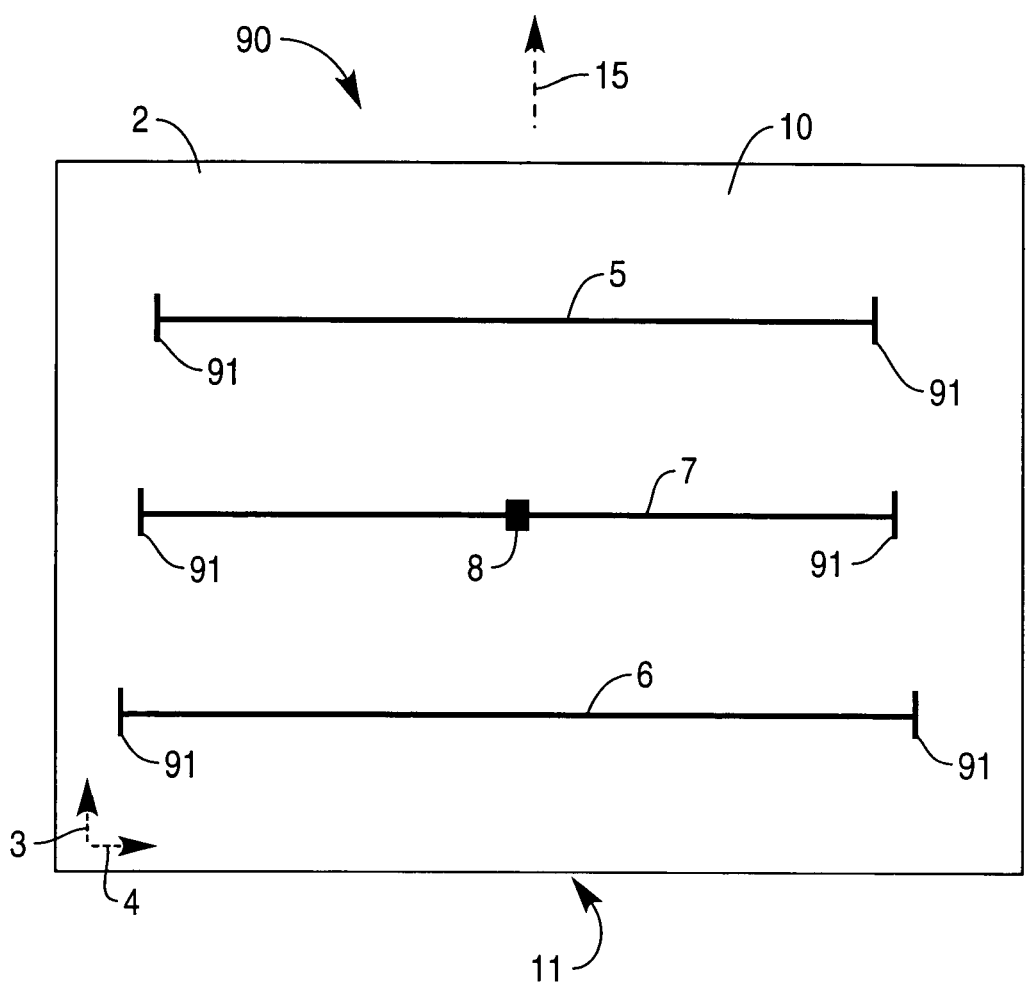
FIG. 7 is a top view of an RFID tag according to a further embodiment of the present invention.

Tag 90 of FIG. 7, which includes relatively narrow elements 5 to 7 each having perpendicularly directed end portions 91 to define extended "H" configurations.

Figure 8:
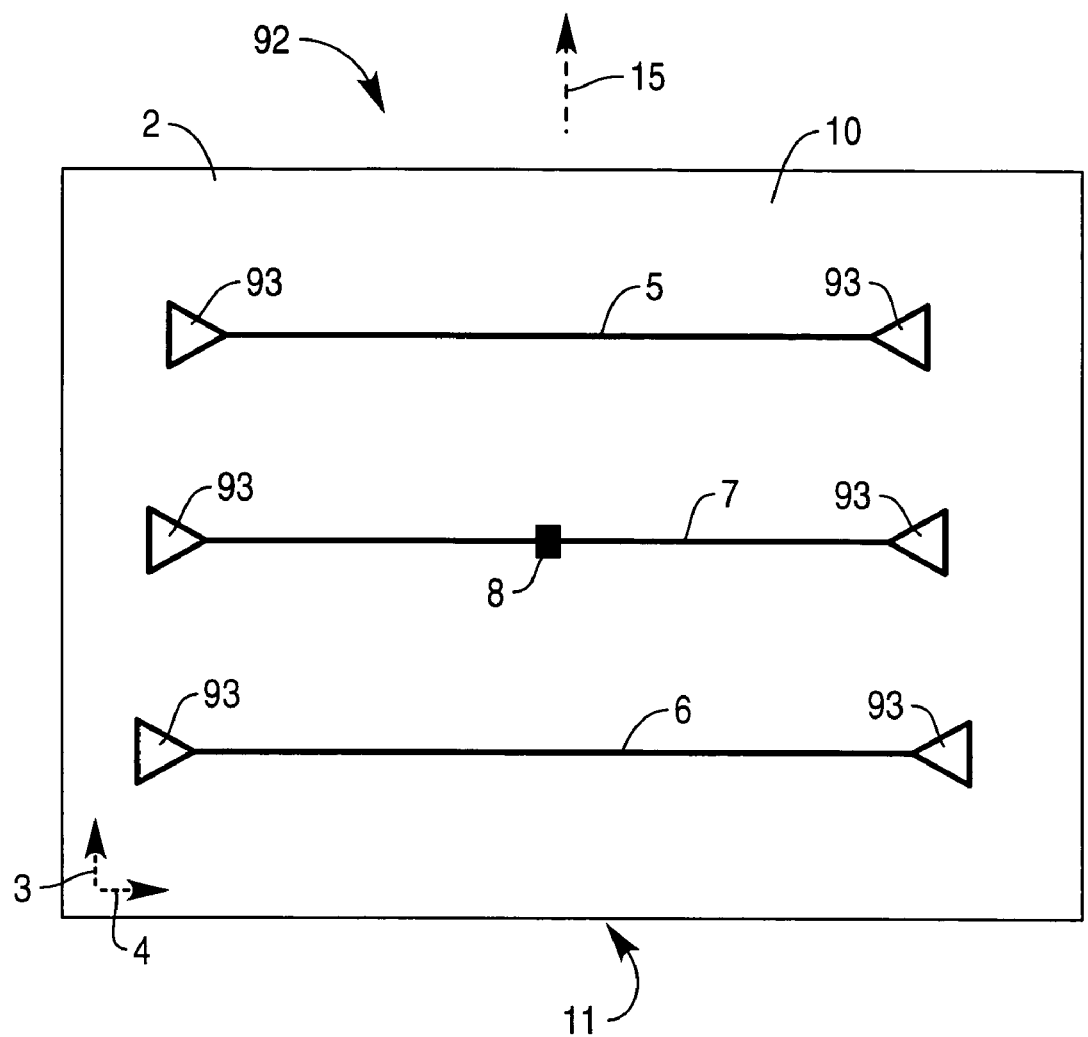
FIG. 8 is a top view of an RFID tag according to a further embodiment of the present invention.

Tag 92 of FIG. 8, in which elements 5 to 7 include respective triangular end portions 93. These provide effective capacitive loading, whilst increasing the effective area of the antenna to provide a greater range.

Figure 9:
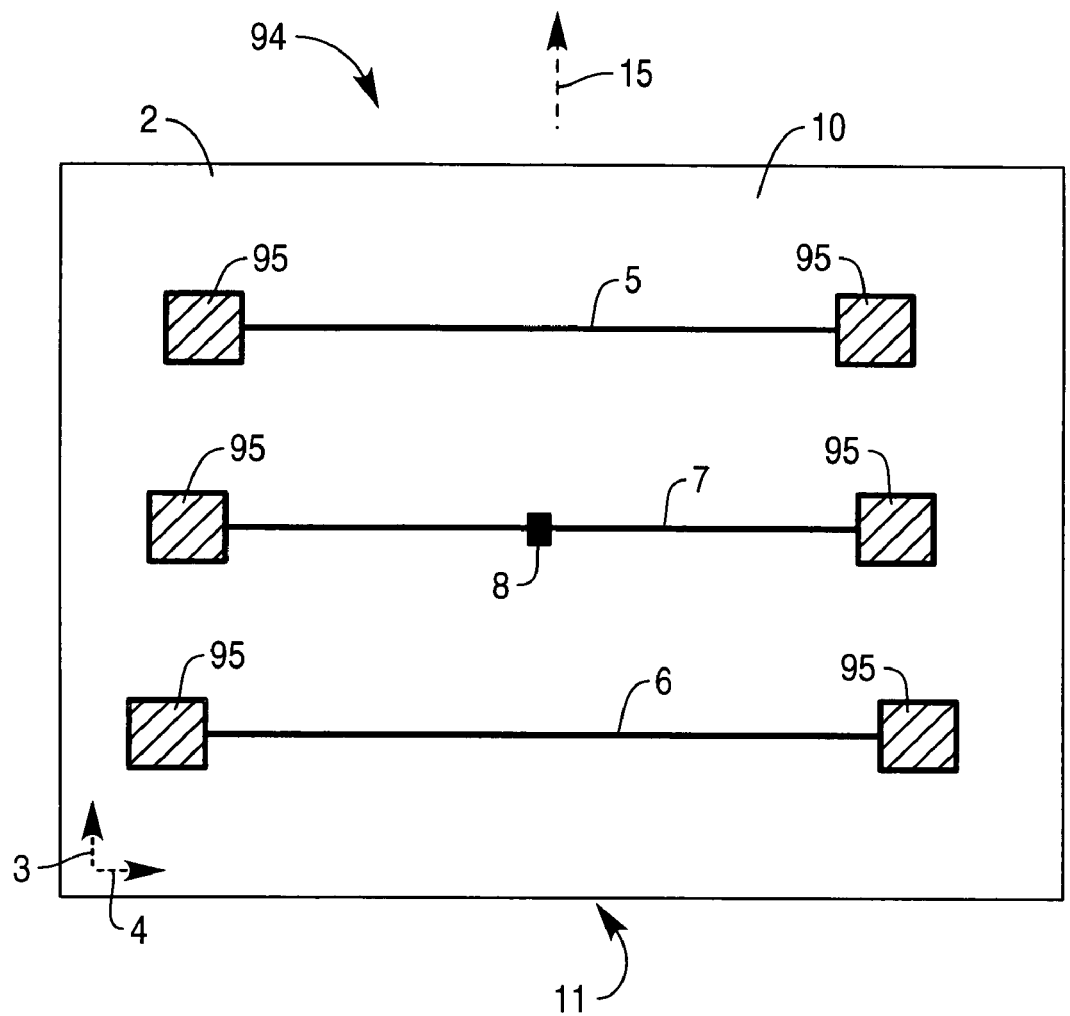
FIG. 9 is a top view of an RFID tag according to a further embodiment of the present invention.

Tag 94 of FIG. 9, which is similar to tag 92, but has rectangular end portions 95.

Generally speaking, by including regions of increasing longitudinal dimensions spaced laterally from the geometric center of each element, it is possible to achieve capacitive loading and reduce the overall size of the antenna defined.

Figure 5:
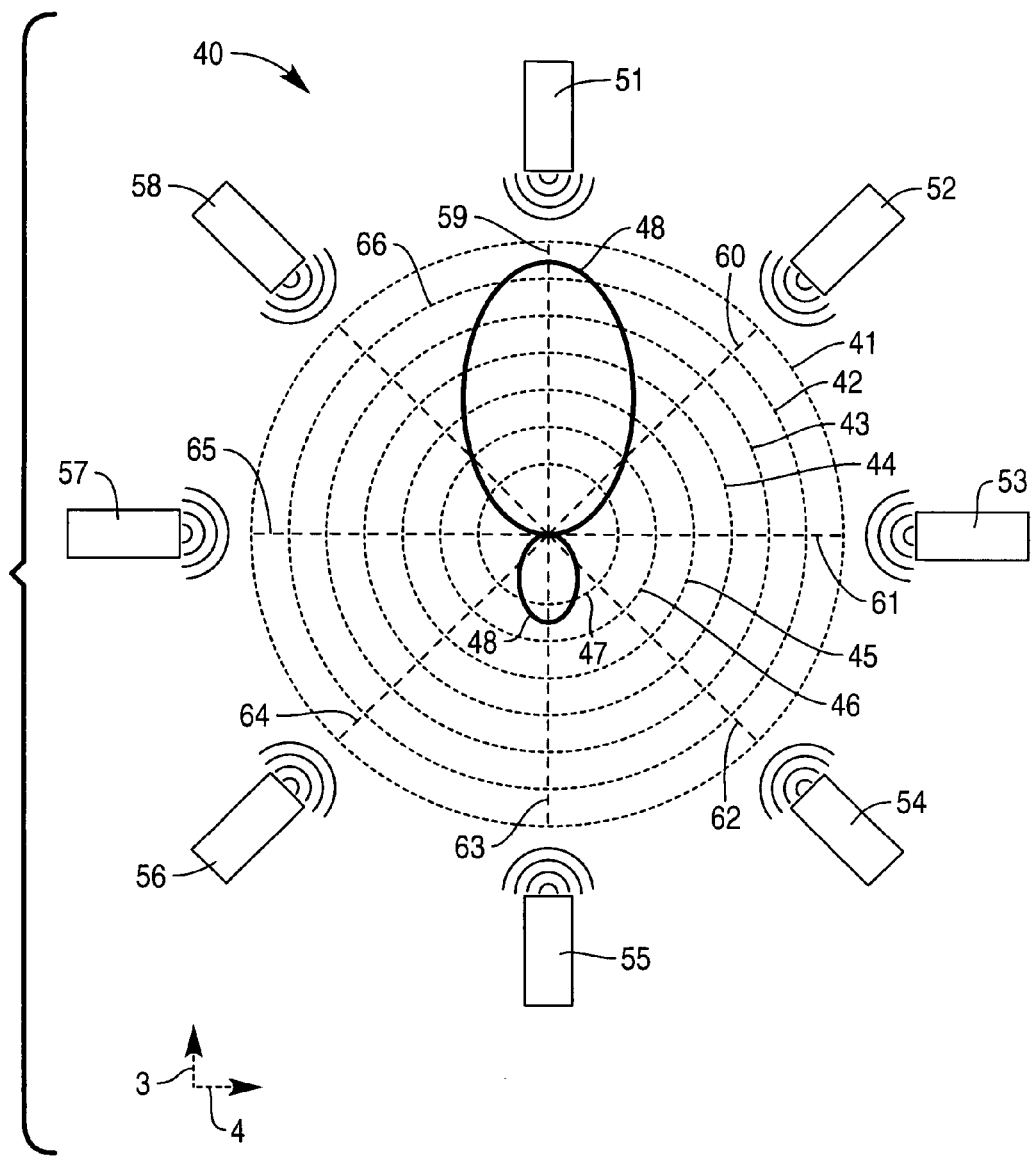
FIG. 5 is a gain diagram for an RFID tag in accordance with the second embodiment.

FIG. 5 illustrates a simplified gain pattern diagram 40 for the tag 20 of FIG. 2. The tag 20 is conceptually located at the center of the diagram, and the reference axes 3 and 4 are provided to illustrate alignment of the tag.

Concentric circles 41 to 47 measure gain, which increases proportionally with the diameter of the circle. Line 48 indicates the gain of tag 20, which is variable with angle. A plurality or RFID readers 51 to 58 are shown at locations angularly spaced about the tag 20. For each reader, a respective line 59 to 66 is provided, this being indicative of a linear interrogation path for the relevant reader. It will be appreciated that interrogation paths are rarely linear in practice, and the present example is provided for the purposes of illustration only. The intersection of lines 59 to 66 with line 48 indicates the gain of the tag 20 in the direction of the relevant reader 51 to 58.

It will be appreciated that for maximum gain, the tag 20 should be aligned in the interrogation path of a reader, and having its director element closest to the reader.

Figure 6:
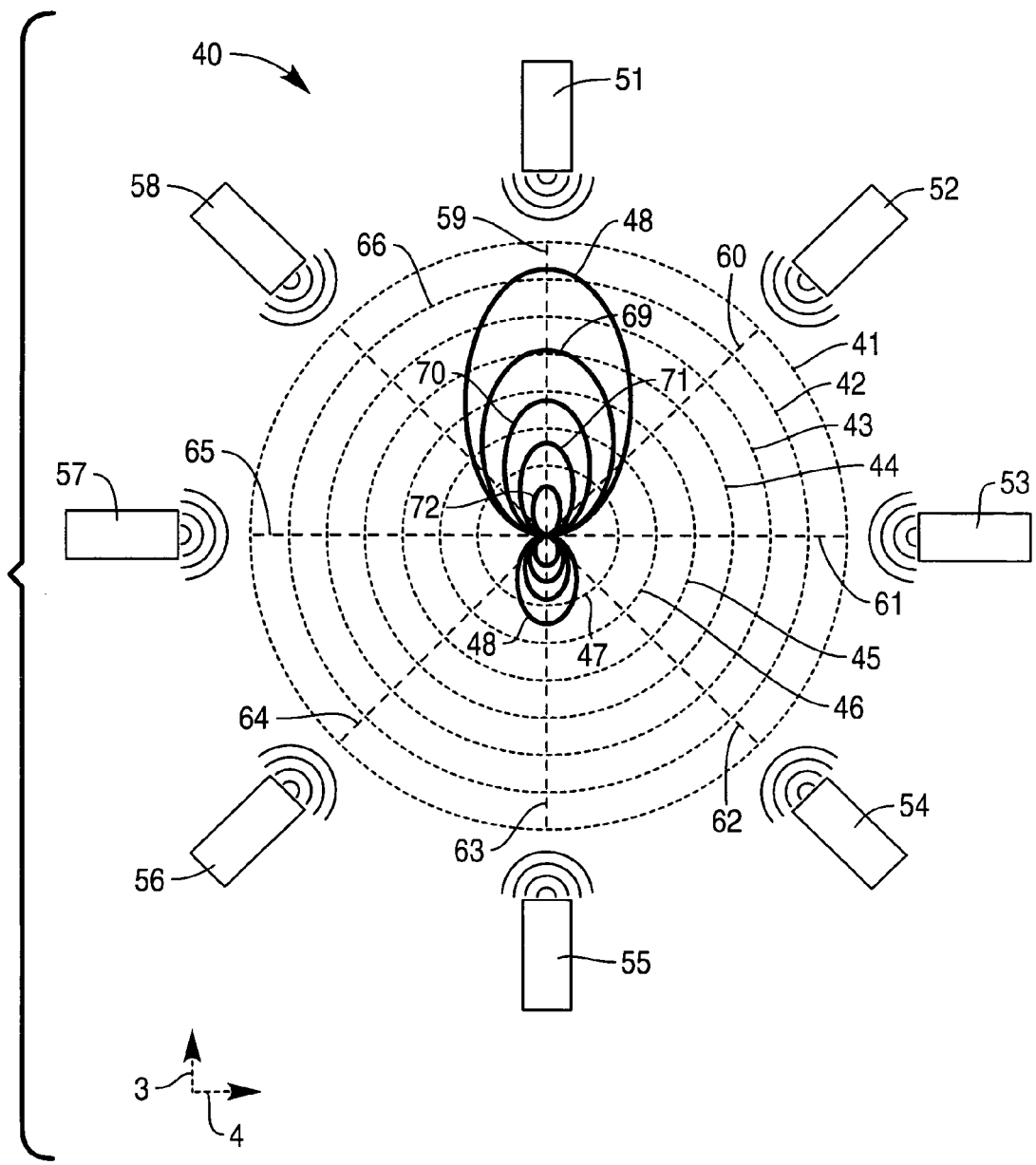
FIG. 6 is a gain diagram similar to FIG. 5, showing three-dimensional variations.

It is noted that the diagram 40 only illustrates gain in two dimensions. In practice gain is a maximum when an interrogation path is in the same plane as the axes 3 and 4. Gain progressively decreases as angular separation between the path and that plane approach 90 degrees, at which point gain is approximately zero. This is illustrated by the gain lines 69 to 72 of FIG. 6.

In a specific example, the maximum gain of the tag 20 is about 6 decibels. In this example, the dimensions of the tag 20 are as follows:

Lateral dimension of the element 5: 11.6 centimeters.

Lateral dimension of the element 6: 12.8 centimeters.

Lateral dimension of the element 7: 12.2 cm.

Distance between the points 80 and 81: 8.275 centimeters.

The remaining dimensions are selected by reference to the impedance of the chip 8 to achieve a conjugate match and thereby maximize power transfer. It is noted that the spacing between the elements 5 and 7 is equal to the spacing between the elements 7 and 6.

It will be appreciated that this specific exemplary tag 20 is sized to on a standard 4 inch by 6 inch RFID label. Previously known RFID tags occupying such labels typically have a maximum gain in the order of 2 Decibels. That being said, the teachings herein should not in any way be regarded as limited to labels of such a size.

Although the present invention has been described with particular reference to certain preferred embodiments thereof, variations and modifications of the present invention can be effected within the spirit and scope of the following claims.

What is claimed is:

1. A radio frequency identification device comprising:
    a surface having a longitudinal axis and a lateral axis,
    a plurality of discrete longitudinally spaced laterally elongate conductive elements mounted to the surface, and
    a radio frequency identification chip conductively attached to one of the elements; and
    wherein the elements comprise:
    a director element,
    a reflector element, and
    a driven element positioned intermediate of the director element and the reflector element; and
    wherein the director element, driven element and reflector element collectively define an antenna; and
    wherein at least one of the elements is configured to provide capacitive loading to the antenna; and
    wherein the radio frequency identification chip is responsive to a signal having a predefined wavelength, and the antenna has a maximum lateral dimension of less than half the predetermined wavelength.

* * * * *